(12) United States Patent
Leenheer

(10) Patent No.: US 10,240,919 B2
(45) Date of Patent: Mar. 26, 2019

(54) METHOD FOR MAKING A NUMERICAL THREE-DIMENSIONAL MODEL OF A STRUCTURE OF SOFT AND HARD PARTS, THREE-DIMENSIONAL MODEL AND CARRIER

(76) Inventor: Dirk Peter Leenheer, Hendrik-Ido-Ambacht (NL)

( * ) Notice: Subject to any disclaimer, the term of this patent is extended or adjusted under 35 U.S.C. 154(b) by 374 days.

(21) Appl. No.: 13/511,044

(22) PCT Filed: Nov. 19, 2010

(86) PCT No.: PCT/NL2010/050777
§ 371 (c)(1),
(2), (4) Date: Jul. 3, 2012

(87) PCT Pub. No.: WO2011/062494
PCT Pub. Date: May 26, 2011

(65) Prior Publication Data
US 2012/0265497 A1    Oct. 18, 2012

(30) Foreign Application Priority Data
Nov. 20, 2009  (NL) ...................................... 2003840
Jul. 6, 2010    (NL) ...................................... 2005040

(51) Int. Cl.
*G06F 17/50* (2006.01)
*G01B 15/04* (2006.01)
(Continued)

(52) U.S. Cl.
CPC .......... *G01B 15/045* (2013.01); *G01B 17/06* (2013.01); *G06T 17/00* (2013.01); *G06T 19/00* (2013.01);
(Continued)

(58) Field of Classification Search
None
See application file for complete search history.

(56) References Cited

U.S. PATENT DOCUMENTS

| | | | |
|---|---|---|---|
| 8,804,905 B2 * | 8/2014 | Christoph et al. | .............. 378/63 |
| 2007/0196790 A1 * | 8/2007 | Cosse | ..................... A61C 9/00 |
| | | | 433/214 |

(Continued)

FOREIGN PATENT DOCUMENTS

| | | |
|---|---|---|
| GB | 713021 A1 | 8/1954 |
| JP | 2006141562 A | 6/2006 |

(Continued)

OTHER PUBLICATIONS

Yusuke Japan Patent Application, Pub. No. 2006-141562, Aug. 6, 2006.*
Polyvinyl Siloxane Wikipedia, Mar. 14, 2007.*

*Primary Examiner* — Aniss Chad
*Assistant Examiner* — Cuong Luu
(74) *Attorney, Agent, or Firm* — The Webb Law Firm

(57) ABSTRACT

The invention relates to a method for making a numerical three-dimensional model of a structure from relatively soft and relatively hard parts, comprising of making by means of penetrating radiation a plurality of numerical sections of the structure located at a mutual distance and representing the absorption for the radiation, storing in a memory the numerical sections and constructing a numerical three-dimensional model of the structure on the basis of the numerical sections stored in the memory, wherein at least during making of the sections at least a part of the relatively soft parts of the structure is provided with a layer of contrast agent with an absorption coefficient for the radiation differing substantially from that of the relatively soft parts.

7 Claims, 5 Drawing Sheets

(51) Int. Cl.
*G06T 19/00* (2011.01)
*G06T 17/00* (2006.01)
*G01B 17/06* (2006.01)
*G06T 7/00* (2017.01)

(52) U.S. Cl.
CPC .. *G06T 7/0012* (2013.01); *G06T 2207/30204* (2013.01)

(56) References Cited

U.S. PATENT DOCUMENTS

| | | | |
|---|---|---|---|
| 2008/0075227 A1 | 3/2008 | Christoph et al. | |
| 2008/0254411 A1* | 10/2008 | Bondar | A61C 8/0001 433/174 |
| 2009/0042167 A1* | 2/2009 | Van Der Zel | A61C 1/084 433/215 |
| 2009/0087393 A1* | 4/2009 | Jensen | A61K 8/22 424/52 |
| 2009/0087812 A1* | 4/2009 | Andersen | A61C 9/0006 433/37 |
| 2009/0162813 A1* | 6/2009 | Glor | A61C 1/084 433/196 |
| 2010/0055639 A1* | 3/2010 | Lewis | A61C 19/063 433/39 |
| 2010/0178252 A1* | 7/2010 | Sagel | A46B 7/04 424/9.6 |
| 2010/0254897 A1* | 10/2010 | Frank | A61N 5/1027 424/1.29 |
| 2010/0285419 A1* | 11/2010 | Cinader, Jr. | A61C 7/16 433/9 |
| 2011/0008751 A1* | 1/2011 | Pettersson | A61C 1/084 433/167 |
| 2011/0033887 A1* | 2/2011 | Fang | B01L 3/502707 435/41 |
| 2011/0045432 A1* | 2/2011 | Groscurth | A61C 1/084 433/75 |
| 2011/0104632 A1* | 5/2011 | Colby | A61C 1/082 433/29 |
| 2011/0192233 A1* | 8/2011 | Aizenberg | B29C 39/026 73/861 |
| 2014/0295377 A1* | 10/2014 | Lewis | A61C 19/066 433/215 |

FOREIGN PATENT DOCUMENTS

| | | |
|---|---|---|
| JP | 2008229322 A | 10/2008 |
| WO | 9426199 A1 | 11/1994 |
| WO | 2005119174 A1 | 12/2005 |

* cited by examiner

METHOD FOR MAKING A NUMERICAL THREE-DIMENSIONAL MODEL OF A STRUCTURE OF SOFT AND HARD PARTS, THREE-DIMENSIONAL MODEL AND CARRIER

BACKGROUND OF THE INVENTION

1) Field of the Invention

The present invention relates to a method for making a numerical three-dimensional model of a structure of soft and hard parts. The invention also relates to a three-dimensional model obtained according to the method. The invention further relates to a carrier for use in the method according to the invention. 'Hard' or 'soft' parts are understood to mean parts having respectively a high or low absorption coefficient for penetrating radiation, in particular electromagnetic radiation such as X-radiation. The terms 'hard' or 'soft' for materials usually do not however always correspond with the mechanical properties of these materials. It is noted that the absorption coefficient of the soft materials differs little from the absorption coefficient of air.

2) Discussion of the Prior Art

Structures of soft and hard parts are common in industry. Examples can be found in the aviation industry, wherein components of composite materials, which in the above sense are soft materials, are mutually connected with metal connecting means such as bolts, which in the above sense are hard materials, or wherein a component of a composite material is connected to a metal component. A hybrid structure is hereby obtained. It can be desirable to make a numerical three-dimensional model of the composite or of the hybrid structure. Such a numerical three-dimensional model can for instance be used to visualize possible defects in the structure or to define a geometry of the composite or hybrid structure for the purpose of manufacturing a component adjacent to the composite or hybrid structure.

Known from WO-A-2005/119174 is a method for making a numerical three-dimensional model of a structure of soft and hard parts, wherein at least the soft parts have an outer surface, comprising of making by means of penetrating radiation at least two sections of the structure located at a mutual distance and numerically representing the absorption for the radiation, storing in a memory the sections numerically representing the absorption and constructing a numerical three-dimensional model of the structure on the basis of the sections stored in the memory, wherein during making of the sections at least a part of the outer surface of the soft parts of the structure is provided with a layer of contrast agent with an absorption coefficient for the radiation differing substantially from that of the soft parts.

As a result hereof at least a part of the contours of components of soft material also becomes visible in the section, whereby a numerical three-dimensional model of the structure can be constructed. In this context substantially is understood to mean that the layer of contrast agent can be distinguished from the soft material in the representation of the section obtained with the penetrating radiation. The layer of contrast agent hereby forms a contour of the component of soft material. This contour can then be used to construct a three-dimensional model of the structure. In this context soft materials are understood to mean materials with a substantially lower absorption coefficient for penetrating radiation than hard materials. Examples of soft materials are plastics and rubbers. Examples of hard materials are metals, some fibres and contrast agents. This group of hard materials is also referred to as radio-opaque.

Although the known method has a good operation under particular conditions, the known method has a limited utility. If the structure is for instance constructed from a plurality of components of soft material, there is a risk that these mutually differing components in the sections cannot be properly distinguished from the surroundings, or at least to lesser extent. This is caused by the shadow effect of highly radiation-absorbing 'hard' material. According to this effect, details of parts through which pass radiations beams which also pass through highly radiation-absorbing parts are represented less well. This effect is further reinforced by the so-called hardening of the radiation, wherein low-frequency, usually designated soft spectra of the radiation spectrum are absorbed more strongly than high-frequency, usually designated hard spectra. Hardening of the radiation thus results in a poorer representation of the details of less highly absorbent parts lying in the shadow of highly absorbent parts.

These drawbacks can be obviated by applying radiation of a greater intensity, although this is undesirable on the one hand because of the heavier charging of the body with ionizing radiation, and is undesirable on the other in respect of the stronger radiation sources required for this purpose, which are usually subject to stricter regulation relating to operation and safety measures.

The object of the invention is to provide means with which the above stated drawbacks are obviated or alleviated.

SUMMARY OF THE INVENTION

This object is achieved in that the contrast agent is applied in a thin layer to the outer wall of the structure prior to making the sections. As a result of these measures less shadow effect or hardening of the radiation occurs, so that high-resolution images can already be produced at a low radiation intensity. A thin layer is understood to mean a layer with a thickness at which the above stated drawbacks do not occur. In other words, the thickness of the layer is preferably such that the degree of radiation absorption of the layer lies in the order of magnitude of the degree of radiation absorption of the soft parts by radiation beams propagated straight through the layer.

Because the layer of contrast agent is arranged on the side of the carrier directed toward the gums and then placed on the gums with some pressure during curing of the contrast agent, the contrast agent is pressed out in a thin layer which is as uniform as possible and which connects very closely onto the gums. Sufficient radiation is absorbed by this layer to make the contours of the outer surface of the gums visible, while sufficient radiation is also allowed through to prevent hardening of the radiation beam.

According to a preferred embodiment, the radiation source used to generate the penetrating radiation and the detector used for detection rotate together during making of the sections. A better reconstruction of the image hereby becomes possible in the manner of computer tomography.

Although it is not precluded that the contrast agent is applied for instance by means of a brush to the outer surface of the structure to be represented, it is recommended that the contrast agent be applied to a carrier and that the contour of the carrier forms an approximation of the contour of the outer wall of the soft parts of the structure. It hereby becomes easier to apply a thin layer of contrast agent.

The carrier can be manufactured from form-retaining material, but also from malleable or kneadable material.

When applying the contrast agent to a surface a user of the carrier can in this latter case exert a pressure on the carrier in the direction of the surface of the component of soft material which is to be provided with contrast agent, whereby the carrier can undergo a deformation and wherein the carrier connects better to the surface to be provided with the contrast agent and provides this surface with the contrast agent with improved accuracy.

In order to prevent the carrier resulting in the effects the invention is attempting to avoid, the carrier is preferably manufactured from material with a low absorption coefficient for penetrating radiation.

Prior to applying of the contrast agent to the carrier the contrast agent is preferably mixed with a material chosen from the group comprising: an elastomer, a non-hardening paste and an adhesive suitable for the soft material.

In an advantageous embodiment the contrast agent is mixed with a material chosen from a group consisting of: elastomer, non-hardening paste and adhesive suitable for the soft material. The contrast agent can hereby be easily applied to the component of soft material, wherein at least during making of the sections the layer takes on the form of the component of soft material because the elastomer and/or the non-hardening paste is deformable. During making of the plurality of numerical sections located at a mutual distance and representing the absorption for the radiation, the layer of contrast agent will retain its form because the elastomer and/or the non-hardening paste has a sufficient form-retention. The elastomer can for instance comprise a rubber, such as silicone rubber, wherein during making of the sections the rubber must be urged against the component of soft material in order to retain the form of the rubber on the side of the component of soft material. If a non-hardening paste is applied, the paste can be arranged with the contrast agent on the component of soft material, wherein the paste retains its form during making of the sections.

The contrast agent can comprise diverse materials. What is important is that the contrast agent has an absorption coefficient for the radiation differing substantially from that of the soft parts. The contrast agent can thus for instance comprise iodine. The contrast agent is selected particularly from the group consisting of: barium sulphate, maghemite ($Fe_2O_3$) and titanium dioxide. Barium sulphate has an absorption coefficient for the radiation differing substantially from that of soft material and is user-friendly, among other reasons because it is a material which is not toxic to humans.

Application of the present invention not only lies in the representation of machines, but also in the representation of biological structures. According to a preferred embodiment the structure is formed by a part of a living body.

A particularly attractive field of application of the invention lies in representing the structures in the mouth. It is precisely in the construction of a numerical model of a chewing system and the parts surrounding the chewing system that a great accuracy is desired. If for instance a part of the chewing system or the whole chewing system of a human or animal has to be replaced, the geometry of the chewing system must be properly mapped. A tooth to be replaced, for instance by a tooth prosthesis, which is placed at an undesired position can be very irritating during chewing and can even result in damage to the parts surrounding the tooth, such as other teeth and particularly teeth situated opposite. Because the chewing system comprises components of hard materials, such as bone, teeth and so on, as well as parts of soft materials, such as gums, the tongue, lips, the empty space, the palate, replacement teeth manufactured from a synthetic resin and so forth, the method according to the present invention can advantageously be applied in a chewing system.

The method is thus preferably adapted to represent the bone structure of the jawbones, the gums and the elements of the chewing system. This is further enhanced in that only limited access to the chewing system is possible and the construction of a numerical three-dimensional model by making by means of penetrating radiation a plurality of numerical sections located at a mutual distance and representing the absorption for the radiation is not affected by the degree of accessibility of the structure for which the numerical three-dimensional model must be constructed.

In the construction of a numerical three-dimensional model of the chewing system and the parts surrounding the chewing system use is preferably made of a dental prosthesis as carrier. Other carriers, such as drill guide, scanning prosthesis or impression tray, are however not precluded. By using such carriers contrast agent can be applied accurately to a desired surface of the chewing system, such as the gums. The dental prosthesis can for instance be an already existing patient-specific dental prosthesis, the geometry of which properly matches the geometry of the chewing system and the parts of the patient surrounding the chewing system. The carrier can also be a drill guide. A drill guide is applied if for instance one or more teeth are replaced. The drill guide is placed at a desired position relative to the jawbone in order to make a drilled hole. A base for a tooth prosthesis can be fixed in the drilled hole, such as a base which fuses with the jawbone or a base which can be screwed into the jawbone. Owing to the unambiguous positioning of the drill guide, the drill guide can advantageously be used as carrier for the contrast agent.

Although diverse types of radiation can be used, use is preferably made of electromagnetic radiation such as X-radiation. Such radiation has a good effect on many materials. In the case the structure is a chewing system of a human or animal, said type of radiation is a good compromise between a sufficient penetration and limited damage to the tissues of the human or the animal.

The invention also provides a three-dimensional numerical model obtained according to a method according to the present invention, characterized in that the three-dimensional numerical model comprises contours of outer surfaces of parts of the structure of soft material. For the advantages of the thus obtained three-dimensional numerical model reference is made to the advantages already discussed above of the method for making a numerical three-dimensional model of a structure of soft and relatively hard parts.

According to another embodiment the contrast agent is provided with a metal powder. Such products can easily be applied in a thin layer, provide a clear image of the representation without resulting in an excessive absorption. The contrast agent is preferably atomized onto the carrier.

The invention further provides a carrier for use in a method according to the present invention. For the advantages of the use of the carrier for the method according to the present invention reference is made to the advantages of the method in which the use of the carrier is discussed.

BRIEF DESCRIPTION OF THE DRAWINGS

The present invention will be further elucidated on the basis of the non-limitative exemplary embodiments shown in the following figures. Herein:

FIG. 1b shows a cross-section of the beam of FIG. 1a;

FIG. 2b shows a cross-section of a side view of a detail of the upper and lower jaw of FIG. 2a;

FIG. 3b shows a cross-section of a side view of the detail of the upper and lower jaw of FIG. 3a;

FIG. 6b shows a cross-section of the upper jaw of FIG. 6a.

DETAILED DESCRIPTION OF THE PREFERRED EMBODIMENTS

Figure 1A:
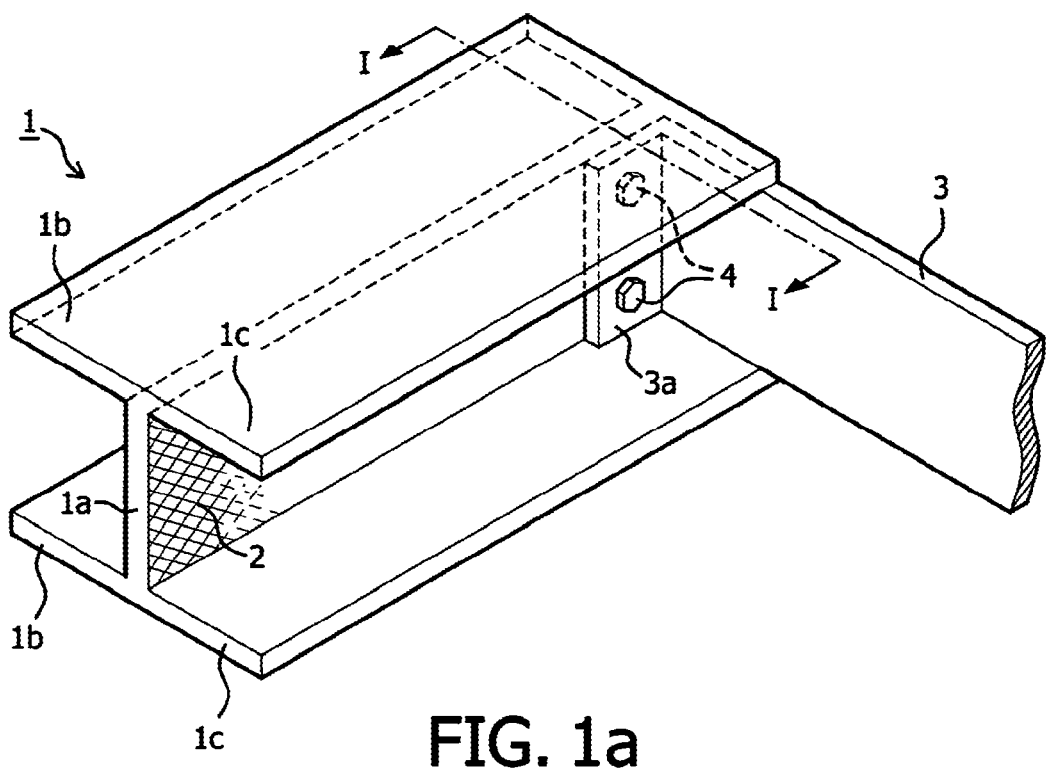
FIG. 1a shows a perspective view of an end part of a beam of an aircraft wing.

Referring to FIG. 1a, an end part of a beam 1, formed as an I-profile, of an aircraft wing is shown. The beam comprises an upright wall 1a and flanges 1b situated on either side of the upright wall. Beam 1 is manufactured from a composite, this composite comprising carbon fibres 2 embedded in an epoxy matrix. Fibres 2 present in upright wall 1a extend substantially at an angle of +45° and −45° relative to the longitudinal direction of beam 1, which imparts a good bending stiffness to beam 1. Transversely of beam 1 a profile 3 is connected to beam 1 for the purpose of connecting beam 1 to another structure of the wing, such as a second beam (not shown). Profile 3 extends here between flanges 1b of the beam 1 formed as I-profile. Profile 3 comprises a bent piece 3a for connecting profile 3 to upright wall 1a. Beam 1 and bent piece 3a of profile 3 are provided for this purpose with corresponding through-openings. Bolts 4 extend from a first side 3b of bent piece 3a through the openings in bent piece 3a and upright wall 1a. Nuts 5 are connected to bolts 4 (see FIG. 1b) for the purpose of mutual clamping connection of beam 1 and profile 3. Profile 3 and the bolts are manufactured from the aluminium alloy 2024. It may be desirable to construct a numerical three-dimensional model of the structure shown in this figure in order to examine the structure for possible damage and to produce a structure connecting to the structure shown here. The method according to the present invention is applied for this purpose.

Figure 1B:
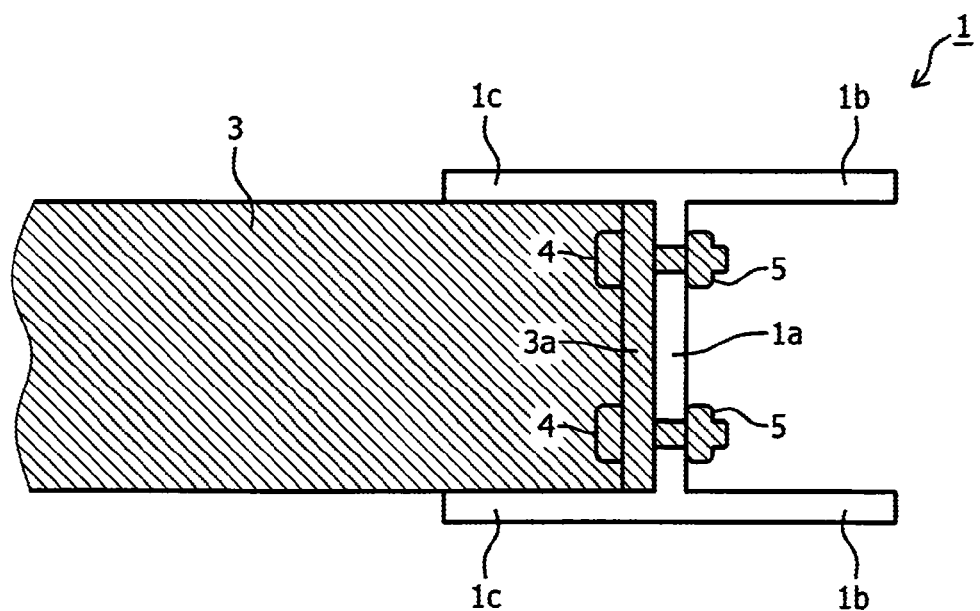

A cross-section along line I-I of FIG. 1 a is shown with reference to FIG. 1b. The cross-section is made by transmitting and absorbing penetrating radiation through the structure. The cross-section shows only the hatched surfaces. These are the surfaces of profile 3 and its bent piece 3a, bolts 4 and nuts 5. Beam 1 is not visible on the cross-section because the epoxy matrix and the fibres from which beam 1 is constructed are manufactured from soft material. However, because beam 1 is provided with a layer of contrast agent over substantially its whole surface prior to making the section, contour 1c of the outer surfaces of beam 1 is visible. The contrast agent used is barium sulphate ($BaSO_4$). Using contour 1c both profile 3 and the beam can be identified in the section. A numerical three-dimensional model of the structure shown in FIG. 1a can be produced by making a plurality of mutually spaced apart cross-sections of the structure of FIG. 1a.

Figure 2A:
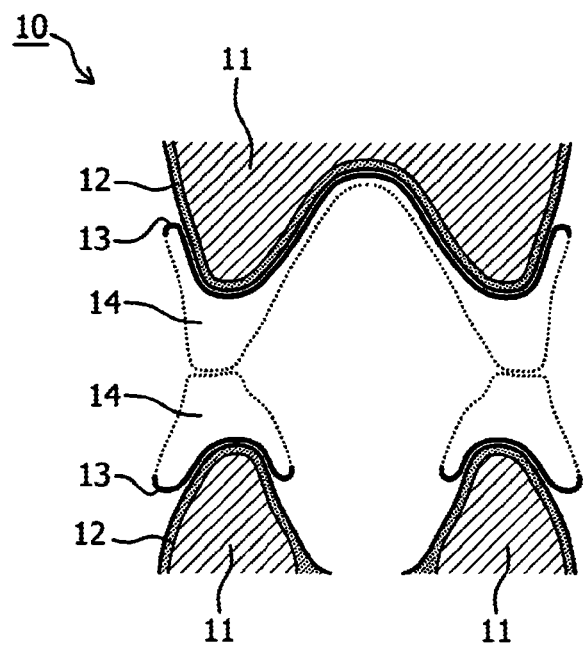
FIG. 2a shows a cross-section of a front view of a detail of the upper and lower jaw of a human, provided with a full dental prosthesis.
Figure 2B:
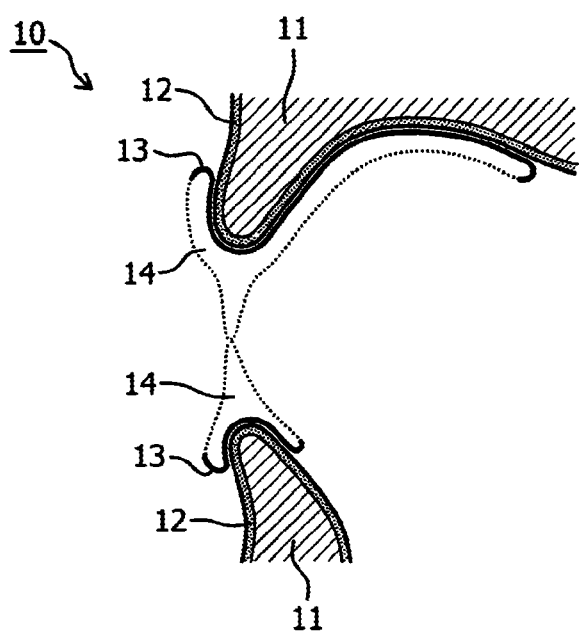
Figure 3A:
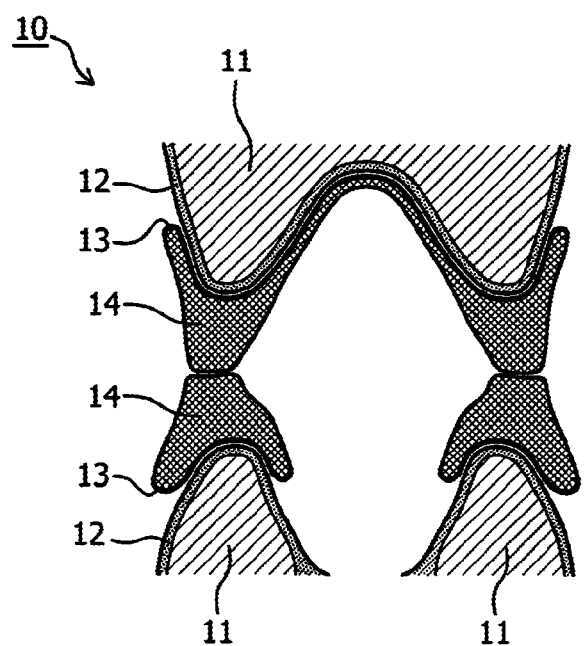
FIG. 3a shows the cross-section of the upper and lower jaw of FIG. 2a, wherein the contours of the dental prosthesis are shown.
Figure 3B:
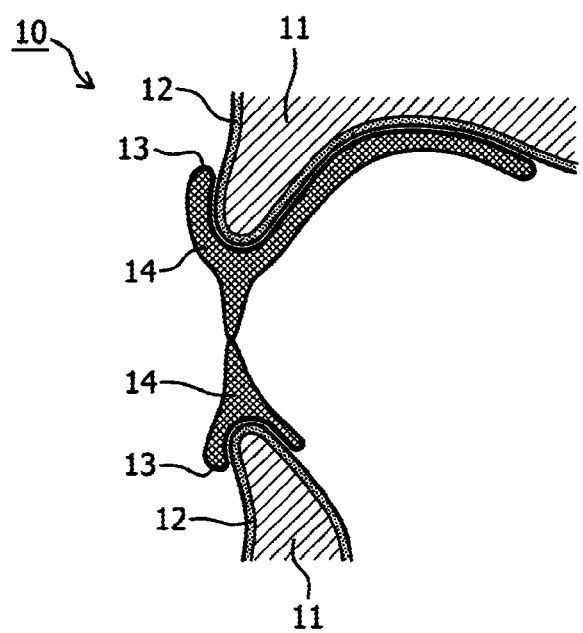

Referring to FIG. 2a, a detail of an upper and lower jaw of a human designated in its entirety with 10 is shown. Upper and lower jaw 10 comprise bone parts 11 around which gums 12 are situated. The upper and lower jaw are provided with a full dental prosthesis which cannot be seen clearly in this FIG. 2a since the material of the prosthesis is manufactured from relatively soft material which is almost transparent for penetrating radiation. The dental prosthesis is provided with a layer of elastomer provided with a contrast agent. The contrast agent is for instance barium sulphate and the elastomer is for instance silicone rubber. The contrast agent is visible as contours 13. Contours 13 of the dental prosthesis and the gums are made visible by applying the contrast agent. FIG. 2b shows the cross-section of a side view of the upper and lower jaw of FIG. 2a designated in its entirety with 10. Upper and lower jaw 10 of FIGS. 2a and 2b are shown with reference to FIGS. 3a and 3b, wherein the contours of dental prosthesis 14, and thereby of the gums, are made visible.

Figure 4:
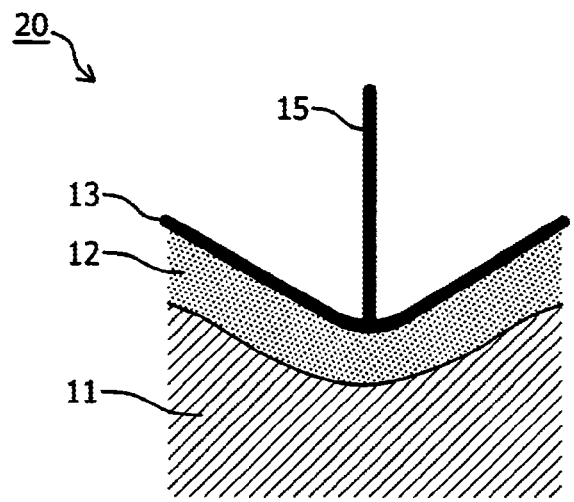
FIG. 4 shows a cross-section of a front view of a detail of a lower jaw of a human provided with an X-ray template.
Figure 5:
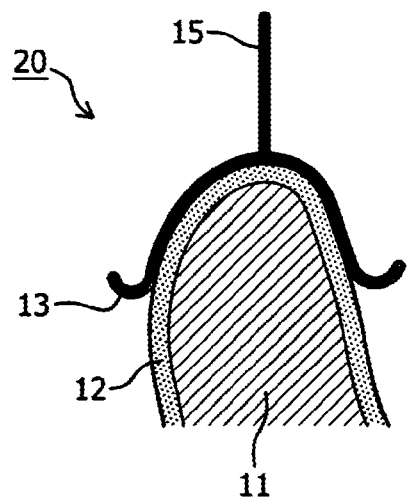
FIG. 5 shows a cross-section of a side view of the detail of the chewing system of FIG. 4.

FIGS. 4 and 5 show a detail designated in its entirety with 20 of respectively a front view and side view of a lower jaw. These figures show that use is made of a carrier embodied as X-ray template. The X-ray template comprises a plate which is manufactured from a synthetic resin and which is not visible since synthetic resin is a relatively soft material, and to which a titanium rod 15 is connected. This rod 15 is visible because titanium is a hard material. Because a surface of the part of the X-ray template manufactured from synthetic resin is provided with contrast agent, contour 13 of the X-ray template and the contour of the gums are visible. The orientation of rod 15 and the contour of the X-ray template indicate the desired direction of the implant to be placed in lower jaw 20. By applying the contrast agent and using rod 15 the construction of a three-dimensional model of lower jaw 20 and the placing of an implant become more accurate. Because the layer of contrast agent is arranged initially on the X-ray template and then on the gums, sufficient radiation is absorbed to make the contours of the outer surface of the gums visible, although sufficient radiation is also allowed through to prevent so-called hardening of the radiation beam.

Figure 6A:
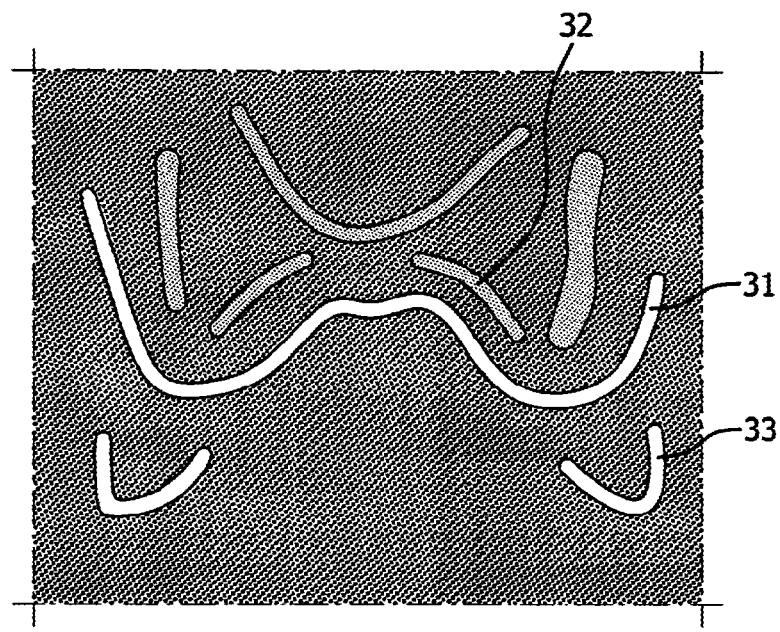
FIG. 6a shows a cross-section of a front view of an upper jaw, wherein the elements are provided with an extra layer of radiation-absorbing material.
Figure 6B:
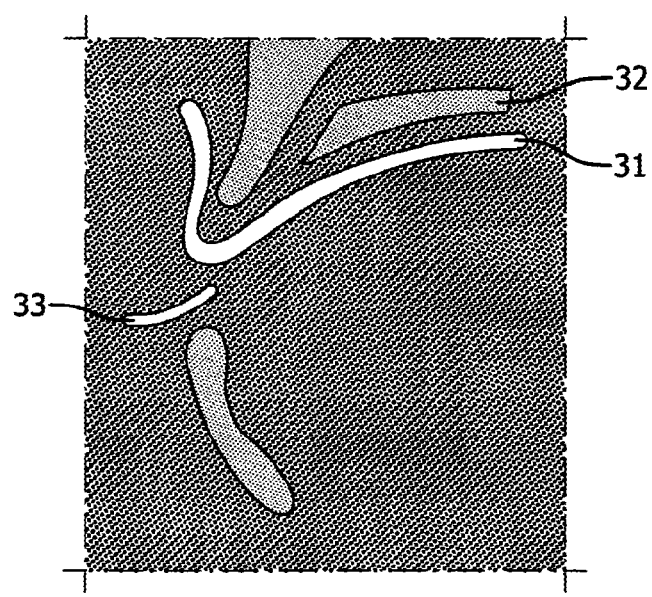

Finally, FIGS. 6a and 6b show the situation where a carrier, such as a dental tray or a badly fitting prosthesis, does not fit properly. The carrier must then first be made precisely fitting by means of a rebasing with impression material, a thin layer of radio-opaque powder, for instance a metal powder, can then be atomized or deposited onto the then perfectly fitting carrier. An adhesive such as carboxymethyl cellulose alginate, gelatin alginate and sodium alginate can optionally be atomized together with the powder so that dislocation of the carrier is avoided. The carrier must preferably be as little radio-opaque as possible.

If it is useful to make some parts visible, for instance the teeth and molars of a prosthesis, this is possible by covering these parts with a thin, ductile, self-adhesive metal foil. This is shown in FIGS. 6a and 6b. In these figures line 31 shows the layer of contrast material applied to the soft parts 32 of the jaw. Lines 33 further represent the foil functioning as contrast agent which is arranged on the elements of a prosthesis. This prosthesis functions here as carrier. Representation of these elements adds extra information regarding the position of the implants to be placed. From the data set produced in the described manner it is possible to directly plan implants and manufacture a drill guide. It is then no longer necessary to combine data sets of extra models or X-scans, to manufacture an X-ray template or make a scanning prosthesis. An implant can then be planned and a drill guide manufactured solely on the basis of a single CT-scan.

It is noted that the metal foil can likewise be used as contrast agent as arranged on the soft parts to be represented.

The invention claimed is:

1. A method for making a numerical three-dimensional model of a chewing system and the parts surrounding the chewing system, comprising hard parts formed by a bone structure of jawbones and elements of the chewing system and soft parts formed by the gums of the chewing system, wherein the gums have an outer surface, comprising:

making at least two sections of the chewing system located at a mutual distance by means of penetrating radiation and numerically representing the absorption for the radiation;

storing in a memory the at least two sections numerically representing the absorption; and constructing a numerical three-dimensional model of the chewing system on the basis of the at least two sections stored in the memory, wherein the step of making the at least two sections comprises:

custom fitting a form-retaining carrier to a chewing system of a patient such that a geometry contour of the carrier matches at least a geometry of the soft parts of an outer chewing system of the patient, wherein the carrier is manufactured from a material with a low absorption coefficient for the penetrating radiation;

applying with the carrier a layer of contrast agent to at least a part of the outer surface of the gums of the chewing system of the patient, wherein the contrast agent has an absorption coefficient for the radiation differing substantially from that of the gums, and wherein the contrast agent is mixed with a non-hardening paste and applied in a thin layer to the outer chewing system of the patient, including the portion thereof adjacent to the gums;

irradiating by the penetrating radiation parts of the chewing system with the thin layer of contrast agent applied to the outer surface of the gums;

determining the absorption of irradiated parts of the chewing system, the carrier, and the contrast agent from the radiation emerging from the chewing system, the at least two sections numerically representing the absorption of the irradiated parts being determined from the absorption of the irradiated parts; and subsequently removing the carrier with the layer of contrast agent.

2. The method of claim 1, wherein a radiation source used to generate the penetrating radiation and a detector used for detection rotate together during making of the at least two sections.

3. The method of claim 1, wherein the carrier is selected from the group consisting of: dental prosthesis, drill guide, scanning prosthesis, impression tray, and carrier specifically manufactured for the structure.

4. The method of claim 1, wherein the contrast agent is further provided with at least one of an elastomer or an adhesive suitable for the soft material.

5. The method of claim 1, wherein the contrast agent is provided with a substance selected from the group consisting of: barium sulphate, maghemite ($Fe_2O_3$), titanium dioxide and a metal powder.

6. The method of claim 1, wherein the contrast agent comprises a powder, and that the powder is atomized onto the carrier.

7. A carrier for use in the method of claim 1, further comprising a structure of which a numerical three-dimensional model must be made, wherein the contour which forms an approximation of at least a part of a contour of the structure.

* * * * *

UNITED STATES PATENT AND TRADEMARK OFFICE
CERTIFICATE OF CORRECTION

PATENT NO.        : 10,240,919 B2
APPLICATION NO.   : 13/511044
DATED             : March 26, 2019
INVENTOR(S)       : Dirk Peter Leenheer Page 1 of 1

It is certified that error appears in the above-identified patent and that said Letters Patent is hereby corrected as shown below:

In the Claims

Column 8, Line 26, Claim 5, delete "(Fe.sub.2O.sub.3)," and insert -- ($Fe_2O_3$), --

Signed and Sealed this
Twenty-eighth Day of May, 2019

Andrei Iancu
*Director of the United States Patent and Trademark Office*